No. 764,699. PATENTED JULY 12, 1904.
J. W. ALVORD.
AUTOMATIC DEVICE FOR DISCHARGING LIQUID TANKS.
APPLICATION FILED MAY 27, 1903.
NO MODEL. 4 SHEETS—SHEET 2.
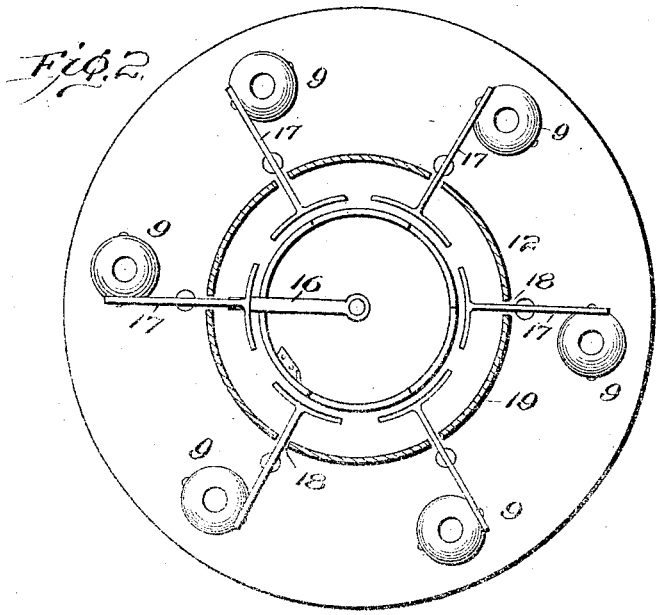
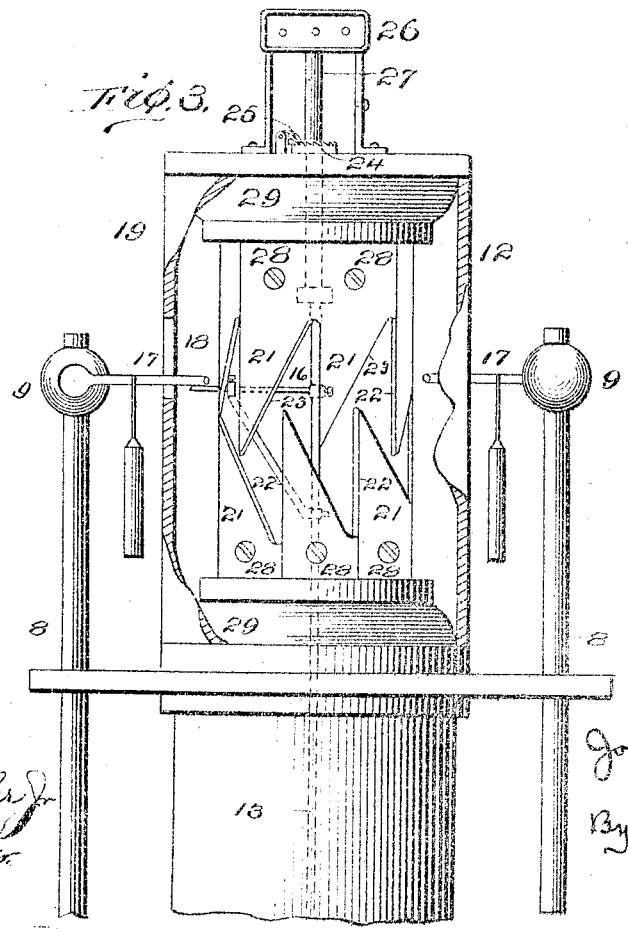

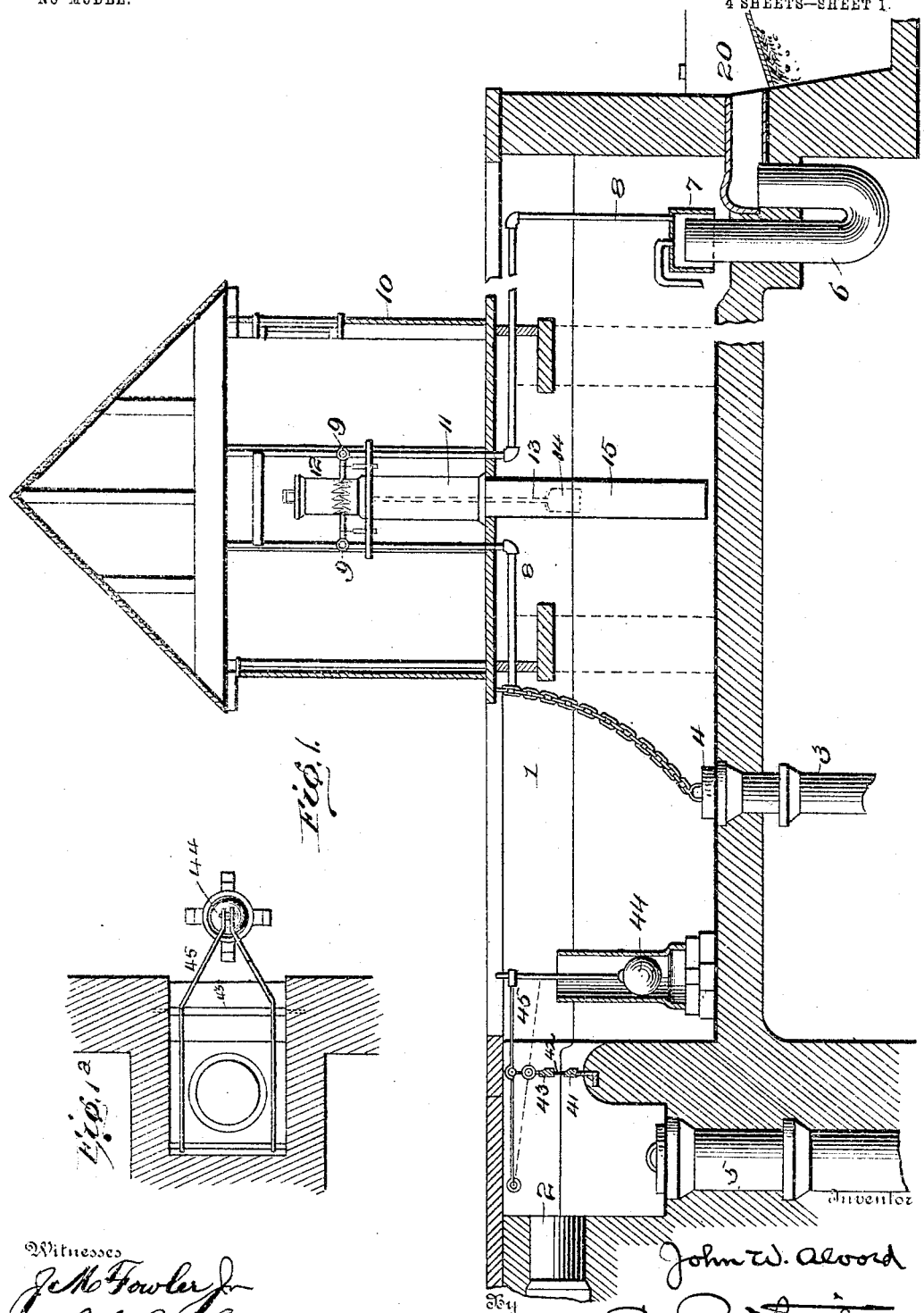

No. 764,699. PATENTED JULY 12, 1904.
J. W. ALVORD.
AUTOMATIC DEVICE FOR DISCHARGING LIQUID TANKS.
APPLICATION FILED MAY 27, 1903.
NO MODEL. 4 SHEETS—SHEET 3.
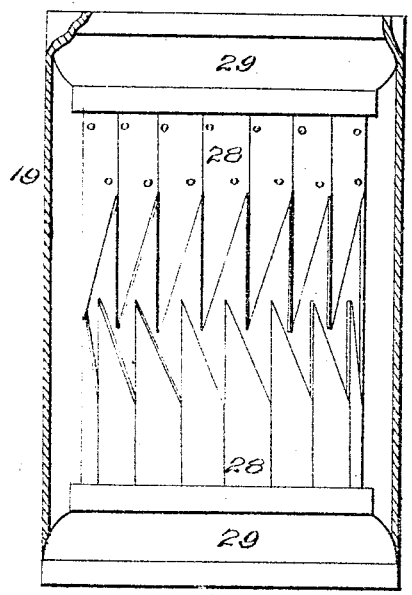
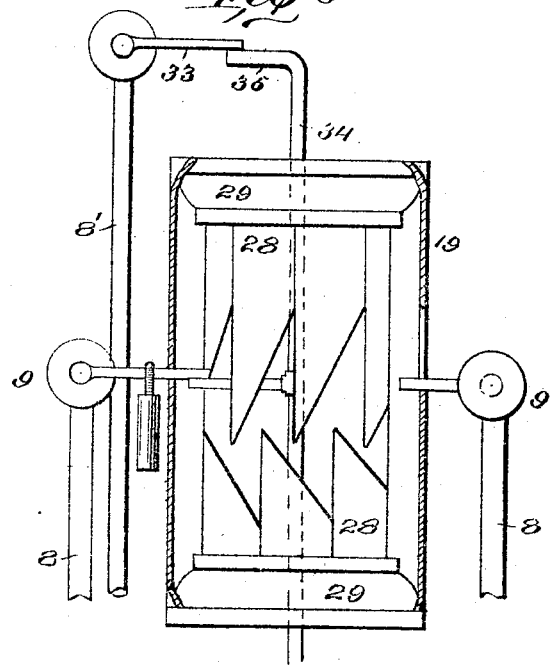
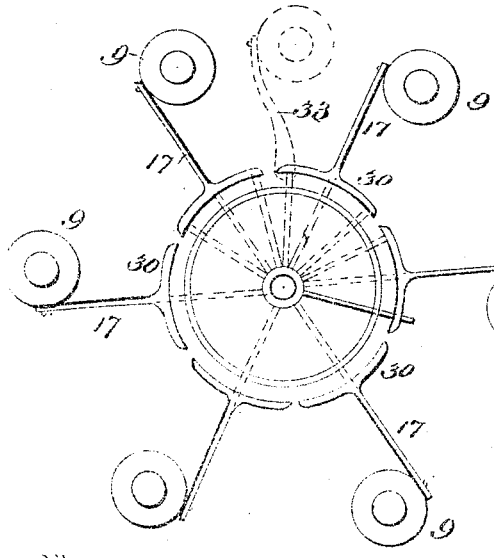
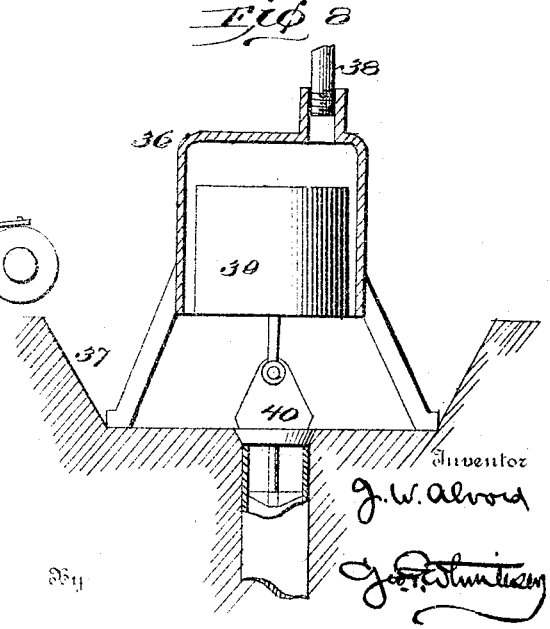

No. 764,699. PATENTED JULY 12, 1904.
J. W. ALVORD.
AUTOMATIC DEVICE FOR DISCHARGING LIQUID TANKS.
APPLICATION FILED MAY 27, 1903.
NO MODEL. 4 SHEETS—SHEET 4.
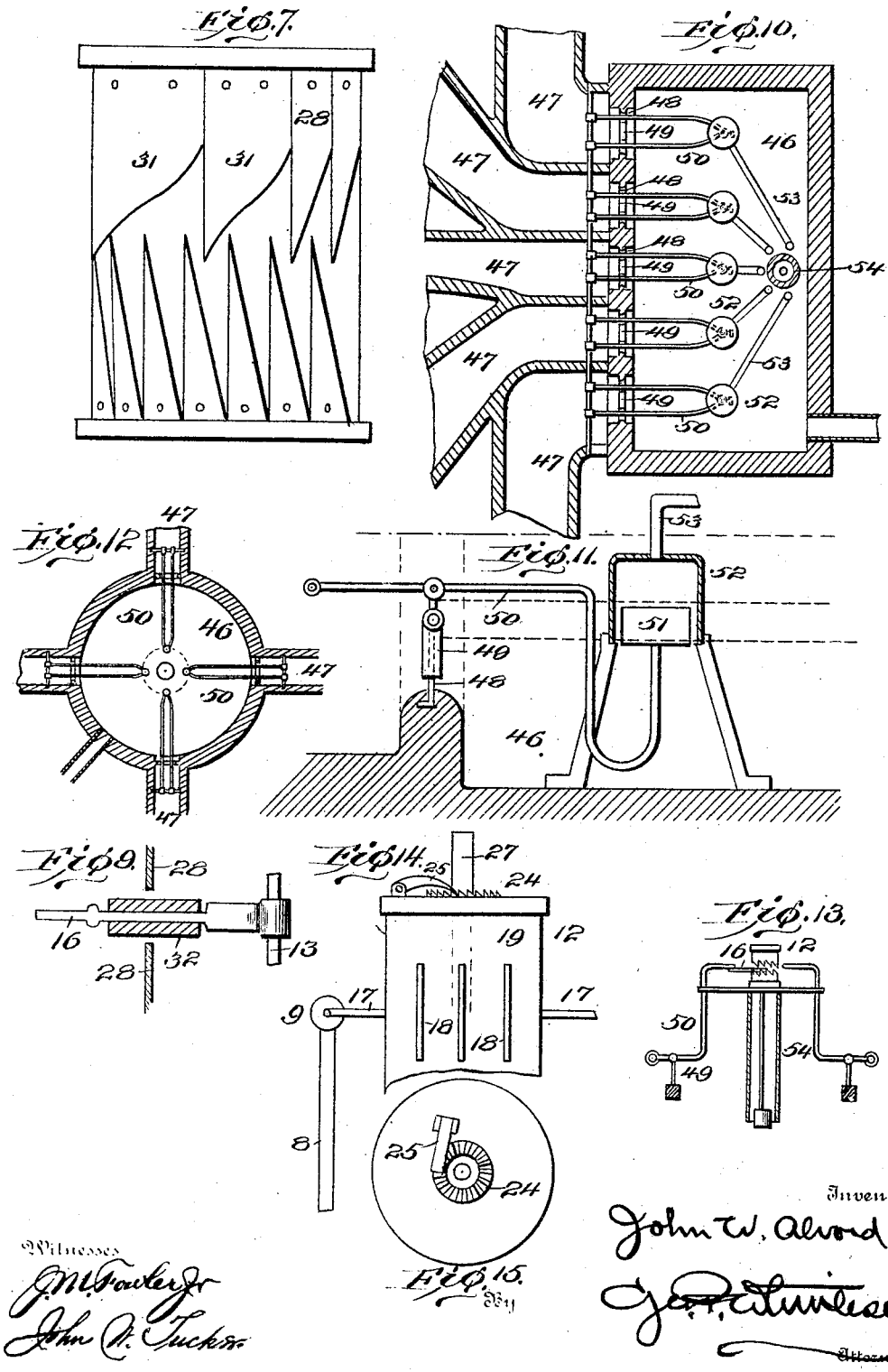

No. 764,699. Patented July 12, 1904.

UNITED STATES PATENT OFFICE.

JOHN W. ALVORD, OF CHICAGO, ILLINOIS.

AUTOMATIC DEVICE FOR DISCHARGING LIQUID-TANKS.

SPECIFICATION forming part of Letters Patent No. 764,699, dated July 12, 1904.

Application filed May 27, 1903. Serial No. 158,987. (No model.)

*To all whom it may concern:*

Be it known that I, JOHN W. ALVORD, a citizen of the United States, residing at Chicago, in the county of Cook and State of Illinois, have invented new and useful Improvements in Automatic Devices for Discharging Liquid-Tanks, of which the following is a specification.

This invention relates to a device by which the sewage in sewage-purification plants is diverted onto different beds in rotation for the purpose of filtering it or upon contact-beds for the purpose of purifying it. The sewage may have had preliminary treatment in a septic-tank or it may be received in its crude state, as may be desired. It is received first into a dosing-chamber, which is filled by the inflowing sewage, and is then emptied in rotation into each of the adjacent tanks filled with a quite coarse material. These are known as "contact-beds," and it is the object and design of the purification plant that each one of these beds in turn should be filled with sewage, allowed to stand three or four hours in contact with the material with which the tank is filled, then gradually emptied and allowed to stand empty for three or four hours for the purpose of aeration. There may be any number of these beds, and in some cases sewage after standing in contact in the first series of beds is emptied into a second or lower series of beds, in which it receives still further purification, and in some cases even a third set of beds may be used; but this is rare.

My invention relates to the appliance by which the contents of the dosing-chamber is emptied into the beds and by which the beds are emptied into the second series of beds or to the outlet, and so on. The device is operated by a float, which rises and falls with the sewage in the dosing-chamber and actuates a series of siphons which are placed so as to discharge the contents of the dosing-chamber into the beds and secondarily the beds into the outlet. The siphons which are thus actuated are the ordinary type of sewage-siphons which fill with air when the dosing-chamber is empty, and as the sewage rises over them the air is compressed in their domes until they become overbalanced and with a certain height of liquid are discharged and empty the contents of the dosing-chamber into the outlet. In applying my invention I so arrange these siphons that they are not discharged in the ordinary manner by being unbalanced, but are set in operation by suddenly releasing the compressed air in the domes through an air-pipe leading to the device and an air-valve upon which the device operates. It is therefore necessary in every case to have siphons which would ordinarily discharge at greater heads than those which I intend to use when applying my device.

In the accompanying drawings, Figure 1 is a sectional elevation of a dosing-chamber provided with my improved discharging devices. Fig. 1ª is a detail plan view of the weir. Fig. 2 is a top plan sectional view of the rotating device. Fig. 3 is vertical sectional elevation of the same. Fig. 4 is a similar section of a modified construction of the head. Fig. 5 is a plan of the same. Fig. 6 shows a further modification of the head. Fig. 7 is still another modification. Fig. 8 is a sectional elevation of a modification of the siphon. Fig. 9 is a modification of the arm on the float-rod. Fig. 10 is a plan view of a modified dosing-chamber and discharging device. Fig. 11 is a sectional elevation of one of the discharge devices in said chamber. Fig. 12 is a plan view of another modification of the dosing-chamber. Fig. 13 is a sectional elevation thereof. Fig. 14 is a side elevation of the head of Figs. 1, 2, and 3, showing a slightly-modified ratchet and pawl. Fig. 15 is a plan view of the same.

The dosing-chamber 1 may be of any desired shape and capacity. The effluent from the septic-tank enters it through the pipe 2. An emergency outlet 3, normally closed by a stopper 4, enables the chamber to be emptied for inspection or cleaning. A by-pass 5 permits the discharge of the effluent directly into an outlet-pipe, if desired, without passing through the dosing-chamber and contact-beds. At one or more points in the dosing-chamber are located the siphons 6, by which the dose of effluent is discharged into the contact-beds, each siphon controlling one bed. The siphons are of the usual construction, having an inverted bell 7 connected by an air-pipe 8 with the automatic device for actuating the valve 9 in said pipe to permit the escape of the air and the consequent discharge of the contents of the chamber through the siphon. This automatic device is conveniently erected in or on the dosing-chamber and is preferably protected by a small building 10. In this building is erected a standard 11, supporting a working head 12 and serving as a guide for a float-rod 13, connected with a float 14 in the dosing-chamber. The float may be protected by a tube 15, if desired, having an open bottom to admit the contents of the chamber. In the working head the rod carries a laterally-projecting arm 16 to operate the controlling devices for the valves 9 in the air-pipes, such as levers 17, attached to the stems of said valves and projecting into the head through slots 18 in the casing 19 of said head. These controlling devices are preferably so constructed as to respond to the actuating-arm in lines parallel with the line of movement of the float. As the chamber fills the float rises, and at the proper time the arm lifts the valve-lever and allows the air confined in the bell of the siphon to escape, thus causing the contents of the chamber to discharge through the siphon onto the contact-bed 20.

In order to operate a number of air-valves and their siphons in recurrence, the working head is provided with means for automatically deflecting the arm 16 as the float rises and falls in a plane transverse to the line of movement of the float in order to actuate the valve-controlling devices in succession. For this purpose I prefer the device which forms the particular feature of novelty of my invention—to wit, two opposite cylinders having teeth 21, which intermesh so as to form a zigzag series of cam-surfaces running around the head and through which the arm 16 projects. One edge of each tooth is vertical and the other inclined, and the vertical edge 22 of one stands opposite the inclined edge 23 of the one opposite to it. In each upward and downward stroke of the arm 16 it will therefore move at first in a straight line until it strikes the incline of the opposite tooth, when it will be carried laterally around as it continues to rise or fall. In each upward stroke the arm will actuate a valve-lever, but on each downward stroke it will pass down between two of said levers and then be deflected laterally under one of them. In order to prevent any backward movement of the rod and arm, the upper portion of the rod is provided with a ratchet-wheel 24, with which a detent-pawl 25 engages. The rod is squared or otherwise splined into the wheel, so that the rod can rise and fall freely without disturbing the wheel, which may be suitably geared to a revolution-counter 26, as by means of a sleeve 27. The toothed cylinders are preferably composed of segments 28, fastened to the heads 29 of the casing 19. This mode of construction enables me to provide for several actuations of the same air-valve and siphon, if desired, so that more than one dose can be discharged upon the same contact-bed. Such an arrangement is shown in Figs. 4 and 5, where the teeth are made narrow, so that three of them operate on the arm 16 during its passage past one of the valve-levers 9, said lever having a broad T-head 30 extending across the arc covered by the three teeth. At no time is the arm 16 above the T-head 30, the lever-arm of said head being long enough to keep in contact with the arm 16 in all positions. On the other hand, if it is desired to put one of the contact-beds out of service a wide segment 31 can be put in, as shown in Fig. 7, which causes the arm 16 to skip several of the teeth in the lower cylinder and the valve lever or levers corresponding thereto. To reduce the friction and relieve the float-rod of undue resistance, the arm may be provided with a roller 32, as shown in Fig. 9.

It may be desired sometimes to automatically empty the contact-bed by an air-controlled siphon similar to the one used for filling the bed. For this purpose the air-pipe 8' may be brought to the rotating device and an air-valve lever 33 arranged to be operated by the arm at a suitable time. This lever may be arranged under the broad end 30 of one of the valve-levers 9, as shown in Fig. 5, or, as shown in Fig. 6, the interpolated lever may be actuated by an upward extension 34 of the float-rod, carrying a second arm 35. Any number of additional levers may be thus operated at any predetermined time in the circuit, as it is evident that this construction may be variously modified to suit the circumstances of any given case. These interpolated levers may also be used to operate a second or third set of contact-beds.

In place of the siphon shown in Fig. 1 I may use the device shown in Fig. 8, where a dome or bell 36 is placed in the lower part of the tank 37 to be emptied and connected by an air-pipe 38 with the automatic operating device. As soon as the air-pressure is relieved the water rises in the bell, lifting the float 39 and with it the valve 40 and allowing the tank to empty. Meantime the air-valve is closed again, and the bell being full of fluid the float is held up and the valve 40 kept open until the level in the tank falls below the bottom of the bell, when the air enters the bell, the contained water and the float fall, and the valve is closed.

It is desirable to use small dosing-chambers to avoid the expense of large ones. By means of my above-described rotating device such chambers are made practical, as they can be filled and emptied into the same contact-bed as many times as may be desired; but in working siphons in this manner with a small dosing-chamber it frequently occurs that the siphon does not readily take air again after the chamber is emptied, because the effluent flows in from the septic-tank almost as fast as it discharges. This results in a series of partial sealings and unsealings of the siphon, which causes the sewage to run through the siphon in a practically continuous stream. In order to remedy this defect, I have devised means to stop the flow into the dosing-chamber for a few minutes just as the last portion of the dose is being emptied through the siphon. The sewage empties into the dosing-chamber over a weir 41, made, preferably, of steel plate and having side slots or guides 42, in which is fitted a vertically-movable gate 43, which is lifted and dropped by a ball-float 44, operating a lever 45. The gate has only a limited rise and fall, and the float is kept submerged at all times except when the dosing-chamber is nearly empty, when by reason of the low level in the chamber the float begins to drop, and as soon as the gate closes down the flow into the dosing-chamber is stopped for a few moments until the sewage behind the weir rises and flows over the gate and begins to fill the dosing-chamber again. This brief intermission of flow is found to be all that is necessary to enable the outflowing-siphon 6 to seal itself with air again after it has discharged the contents of the dosing-chamber. This automatic weir therefore coöperates with the rotating device to bring about a perfect action of the siphons and cause an automatic and effective discharge of the dosing-chamber at predetermined intervals of time. If desired. I may substitute for the siphons devices in which this weir is a feature. In Figs. 10 and 11 the dosing-chamber 46 is connected with a plurality of channels 47, leading to various contact or filtering beds. Each channel is controlled by a weir 48 and gate 49, the latter operated by a lever 50, attached to a float 51 in a bell 52 in the dosing-chamber. The bell is connected by an air-pipe 53 with an automatic rotating device 54. When the weir-gates are closed, the sewage rises in the dosing-chamber until the float in the rotating device opens the air-valve in the pipe from one of the bells, releasing the air and allowing the sewage to enter the bell and lift the float and the gate. This form of discharging device is especially applicable where very little fall is available. If desired, the weirs and gates can be operated directly by the float in the automatic rotating device, as shown in Figs. 12 and 13, which shows a circular dosing-chamber with discharging-channels radiating from it, each controlled by a weir and gate whose lever is operated by the arm on the float in the central standard.

Having thus described my invention, what I claim is—

1. An apparatus for the purpose set forth, comprising a liquid tank or receptacle, a plurality of discharging devices for emptying the same, a float in said receptacle, a plurality of devices for controlling said discharge devices constructed to be actuated in lines parallel with the line of movement of the float, an arm carried by said float, and means for automatically rotating said arm in a direction transverse to the line of movement of said float in order to bring it in line with the controlling devices in succession.

2. An apparatus for the purpose set forth, comprising a liquid tank or receptacle, a plurality of discharge devices for successively emptying said tank, each of said devices comprising a valve and operating lever, a float in said tank, an arm carried by said float, and means for automatically deflecting said arm as the float rises and falls in order to cause it to actuate said lever successively.

3. An apparatus for the purpose set forth, comprising a liquid tank or receptacle, a plurality of siphons for successively emptying said tank, an air-pipe connected with each siphon, valves in said pipes, a float in said tank, an arm carried by said float, and means for automatically bringing said arm into actuating position with reference to said valves in succession as the float rises and falls.

4. An apparatus for the purpose set forth, comprising a liquid tank or receptacle, a plurality of siphons for emptying the same, an air-pipe connected with each siphon, a valve in each pipe, said valves being grouped in a circle, a float in said tank, an arm carried by said float, and a plurality of opposing cam-surfaces for causing said arm to rotate and to operate said valves in succession as the float rises and falls.

5. In an apparatus for the purpose set forth, the combination with a liquid-tank, of two or more discharging devices therefor, a float in said tank, of an arm carried thereby, and adapted to operate said discharging devices, and a head provided with two sets of teeth having vertical and inclined edges, between which said arm plays.

6. In an apparatus for the purpose set forth, the combination with a liquid-tank, of two or more discharging devices therefor, a float in said tank, an arm carried thereby, and adapted to operate said discharging devices, and a head having two circular sets of teeth each having a vertical and an inclined edge, the vertical edges of the teeth in one set being opposite the inclined edges of the teeth in the other set.

7. In an apparatus for the purpose set forth, the combination with a circular series of air-pipes and valve-levers, of a head having a casing provided with slots for said levers, end plates for said casing, a plurality of segments attached to each end plate, each segment having a vertical and an inclined edge, a float-rod in said casing, and an arm on said rod projecting out between said segments in line with said levers.

8. An apparatus for the purpose set forth, comprising a liquid tank or receptacle, one or more siphons for emptying the same, means for operating said siphon, and means for momentarily checking the flow of liquid into said tank after it has been emptied.

9. An apparatus for the purpose set forth, comprising a liquid tank or receptacle, one or more siphons for emptying the same, means for operating said siphon, a gate in the supply-conduit for said tank, and means for automatically closing said gate temporarily at the end of the emptying operation.

10. An apparatus for the purpose set forth, comprising a liquid tank or receptacle, one or more siphons for emptying the same, means for operating said siphon, a gate in the supply-conduit for said tank, and a float in said tank connected with said gate.

In testimony whereof I have signed my name to this specification in the presence of two subscribing witnesses.

JOHN W. ALVORD.

Witnesses:
    FRED G. WILBER,
    CHAS. B. BURDICK.